Inventor:
Ferdinand Lange-Wiehe
Bierman & Bierman
Attys

Dec. 6, 1966  F. LANGE-WIEHE  3,289,914
BLANK FOR PRODUCING CARTONS
Filed Jan. 29, 1962  9 Sheets-Sheet 4

Inventor:
Ferdinand Lange-Wiehe
By Bierman + Bierman

Dec. 6, 1966   F. LANGE-WIEHE   3,289,914
BLANK FOR PRODUCING CARTONS
Filed Jan. 29, 1962   9 Sheets-Sheet 6

Inventor:
Ferdinand Lange-Wiehe
By Berman & Berman

Dec. 6, 1966   F. LANGE-WIEHE   3,289,914
BLANK FOR PRODUCING CARTONS
Filed Jan. 29, 1962   9 Sheets-Sheet 8

Inventor:
Ferdinand Lange Wiehe
By Berman & Berman

United States Patent Office 3,289,914
Patented Dec. 6, 1966

3,289,914
BLANK FOR PRODUCING CARTONS
Ferdinand Lange-Wiehe, Minden, Westphalia, Germany, assignor to Werner Bahlsen, Hannover, Germany
Filed Jan. 29, 1962, Ser. No. 169,354
3 Claims. (Cl. 229—31)

The present invention relates to a method of manufacturing preferably flat folding boxes which are open on one side and are made of paper, cardboard or the like, with laterally protruding extensions on the upper edge, and the closing of these boxes by application of a closure member to the laterally protruding extensions, for instance by heat-sealing.

The difficulty in the heat-sealing, etc., of closure members, to laterally protruding flaps is that there is the danger that the closure member which consists, for instance, of a sheet, is not completely heat-sealed to the pre-cut parts at the corners of the box, and that, accordingly, channels are formed extending into the box from the outside. This is particularly true for the reason that the corresponding edges of the box are too weak and deform under the pressure of the welding tool or the like, since sufficiently large surfaces are not present for the welding together of the flaps and the closure member.

These disadvantages are avoided in accordance with the present invention in the manner that a pre-cut blank having a continuous peripheral strip is folded inward in such a manner that the peripheral strip parts form the protruding flaps; that pairs of fold triangles developed between the side wall members are folded outwards, that the closing is effected while the pairs of folding triangles protrude outwards and that thereupon the pairs of folding triangles and the flaps connected with the closure member are folded onto the box.

By the method in accordance with the invention, there is first of all formed a box open on one side to which, in order to cover the opening of the box, sufficient pressure can be applied to assure a dependable connection of the sheet also at the corners of the box, since the corners of the box are sufficiently reinforced by the pair of fold triangles which protrude during the covering process.

In order furthermore to have available, a sufficiently large area of bent flaps to which the cover part can be connected, one can, in accordance with the invention, bend apart the flaps forming marginal strips arranged on the outwardly bent fold triangles before the cover member is applied.

In order to avoid channels leading into the inside of the box, in accordance with a further feature of the invention, the pairs of fold triangles developed upon the bending of the interconnected flaps on two opposite side wall members and on the fold triangles facing same and bent off at right angles thereto, are folded below the bent flaps. This can advantageously be effected in the manner that first of all the flaps of the side wall members are bent in such a manner that the fold edges of the pairs of fold triangles come to lie at the fold edges between the fold triangles and their flaps and that these last-mentioned flaps are then bent.

This is advantageous in particular also when the closure member is not formed by a separate sheet or the like but by a correspondingly developed part of the blank. One can advantageously with a single heat-sealing process, heat-seal the outward bent fold triangles and the pairs of fold triangles folded inward under the flaps at these fold triangles, between the marginal strip flaps and possibly heat-seal the marginal strips at the side wall parts to the marginal strips of the closure member.

In accordance with another characteristic of the invention, the blank can also be in part provided, before the folding, with an inner lining, for instance a sheet, which is pasted thereto and then folded together with this inner lining. The closure of the inner lining can then take place separately or else together with the blank.

The outwardly folded fold triangles, after the closing of the package, are advantageously folded up on the side wall from which they still protrude at an angle of 90° after the inward folding of the unilaterally open box, whereupon the inward folded flaps or the closure strips formed thereof are then folded over said side wall or else over the cover.

However, and particularly when using a rectangular blank, one can bend the outwardly folded fold triangles at a right angle to the fold edge connecting them and fasten the broadened marginal strip flaps of the closure part which thereby lay themselves on the corresponding side wall members (possibly after the overlying portion of said flaps has been folded inward) onto the side wall. There is then produced a folded box which can be made waterproof and aromaproof in a simple manner and does not have any parts folded towards the outside.

Such a box is substantially reinforced on two side walls by the folded blank material. It can accordingly be made of a thin blank material and in accordance with the invention reinforced also on the other box walls, in the manner that a reinforcing insert is pasted onto the blank on the base surface, the two other side walls and the closure part.

If no separate closure part is used and the closure part consists of a part of the blank itself, the closure can be developed in the manner that an additional flap is provided on a side wall member which flap is connected with the flaps on the outward bent fold triangles and is connected with the marginal strip of a closure part which extends over the box opening so as to form a longitudinal closure strip.

In accordance with the invention, one can furthermore, when using a separate closure part in the form of a sheet or the like, develop two flaps arranged on the box edge as cover flaps which are folded onto the box. In this connection, the cover flaps can advantageously be provided with lateral tabs which when the rest of the flaps are folded in at the box edge are also folded in and are inserted into one another when the cover flaps are folded down.

The method of the application is shown in the accompanying drawings on basis of a few illustrative embodiments.

Figure 1:
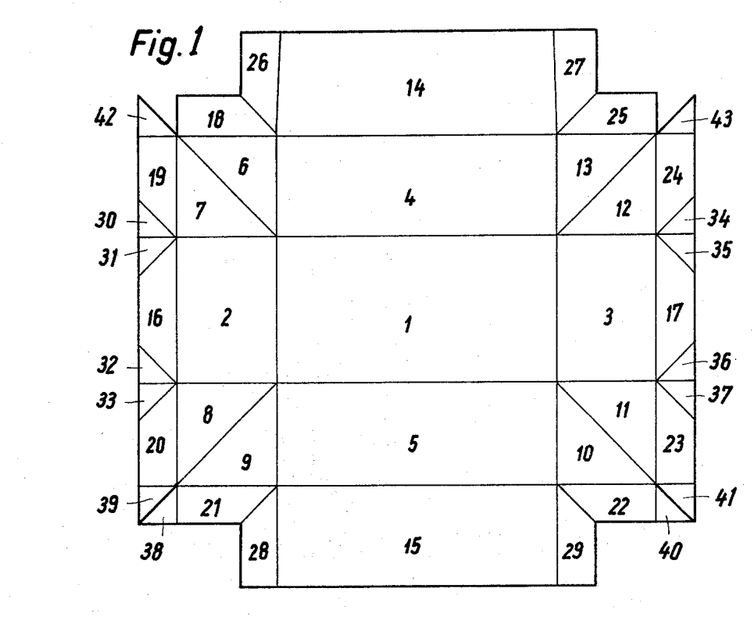
FIG. 1 is a blank for a first embodiment of the method of the invention.

The blank shown in FIG. 1 has a base surface 1 which is connected with side wall portions 2 to 5. The side wall portions are connected with each other by fold triangles 6 to 13. On side walls 4 and 5 cover flaps 14, 15 are provided. The side wall parts 2 and 3 have flaps in the form of edge-strip parts 16, 17. Corresponding flaps are connected with the fold triangles 6 to 13. These edge-strip parts are designated 18 to 25. The cover parts 14 and 15 have edge-strip parts 26 to 29. The edge strip parts which are connected with the side wall parts 2 and 3 and the fold triangles 6 to 13 are connected with each other via fold triangles 30 to 37. Furthermore, fold triangles 39 to 43 are provided between the edge-strip parts on the fold triangles 6 to 13 which, in case of the blank described here, can to be sure also be eliminated. They are shown on the one side of the blank, for instance, arranged in pairs (38, 39; 40, 41) and on the other side individually (42; 43).

Figures 2, 3:
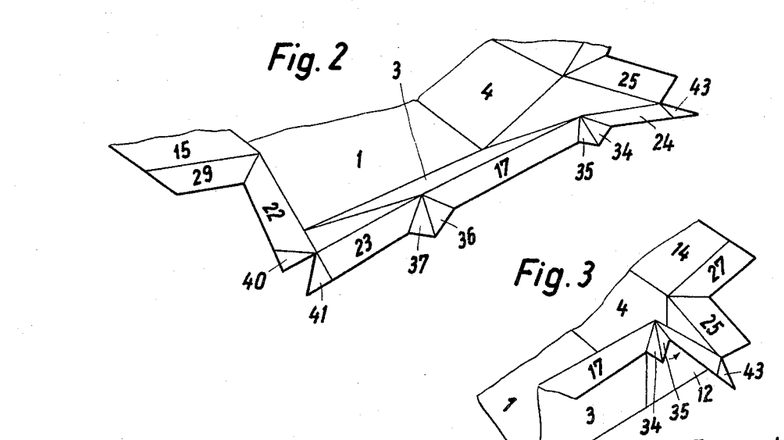
FIGS. 2 and 3 show the folding of the blank of FIG. 1.

For the folding together of the blank shown in FIG. 1, the side wall parts 2 to 5 are first of all brought to upright position and the pairs of fold triangles 6 to 13 bent outwardly so that they protrude at a right angle from the side wall members 2 and 3 (FIGS. 2 and 3). This can be simply effected in the manner that the side wall members 2 and 3 are folded in by folding blocks, for instance in a folding channel which straightens up the side wall parts 4, 5, which blocks are arranged for instance on travelling chains.

After the side wall members have been brought upright pairs of triangles 6 to 13 are heat-sealed which also can be effected by means of the above-mentioned folding blocks.

Figure 4:
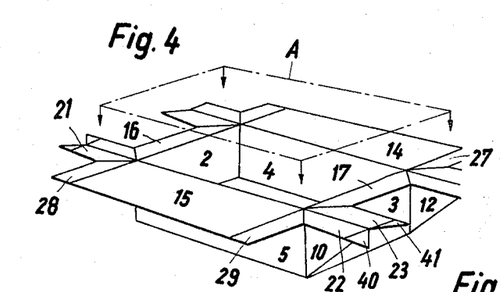
FIG. 4 shows the closing of the folded unilaterally open box by a closure part in the form of a sheet.

Thereupon the edge-strip members 16, 17 of the side wall parts 2 and 3 are bent outward, onto folding blocks when the latter are used (FIG. 4).

The edge-strip parts 19, 20; 23, 24 can now either be folded onto the corresponding edge strip parts 18, 21; 22, 25 of the other fold triangles or else they can be also bent towards the side wall members 2 and 3. The latter has the advantage that a greater resting surface for the closure part is formed.

In this latter case, the fold triangle pairs 30 to 37 can be so bent-in either upon the bending of the edge-strip parts 19, 20 and 23, 24 or after same that they come to rest below the edge-strip parts 16, 17 or else under the edge-strip parts 19, 20; 23, 24. In the latter case, as will be shown later on, the heat-sealing is facilitated. In the former case, to be sure, one avoids having the folding edge between the pairs of folding triangles extending directly into the inside of the box.

Figure 5:
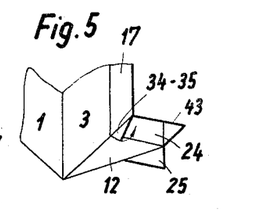
FIGS. 5 to 14 show the final closing of the folded box.

The fold triangles 30 to 37 must then be heat-sealed together which can be done without difficulty with a heat-sealing tool which includes the folding edge between these triangles. When the folding triangles below the edge-strip parts 19, 20; 23, 24 have been folded (FIG. 5), the heat-sealing of these folding triangles is possible in a dependable manner by slightly bent heat-sealing tools which cover the edges between the fold triangles.

After the edge-strip parts 16, 17 and 19, 20; 23, 24 have been bent down, or else simultaneously therewith or prior thereto the cover parts 14, 15 as well as the edge-strip parts 18, 21, 22, 25, 27 to 29 are also bent off at a right angle so that there is formed a relatively wide surface arranged around the box opening. To this surface, after the box has been filled, there is glued a sheet A or the like, preferably a transparent sheet, in which connection gluing can also be effected in dependable manner even in the corners, since a relatively high pressure can be applied to said corners. This is true, in particular, for the reason that the corners are stiffened by the vertically protruding pairs of fold triangles 6 to 13.

Figures 6, 7, 9:
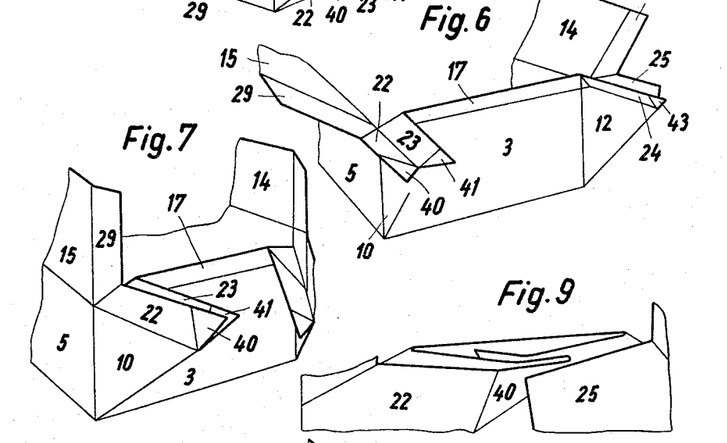
Figure 8:
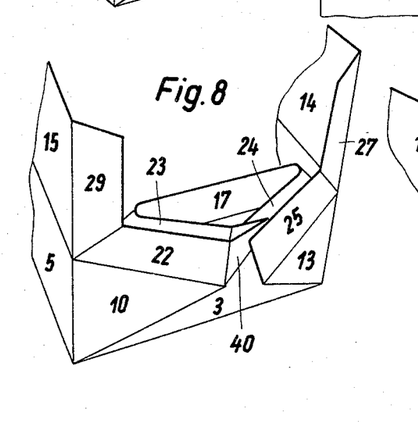
Figure 10:
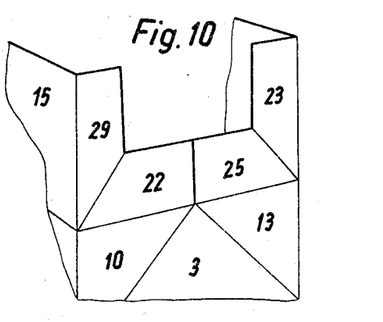
Figure 11:
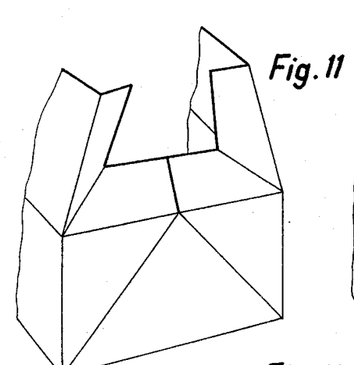
Figure 12:
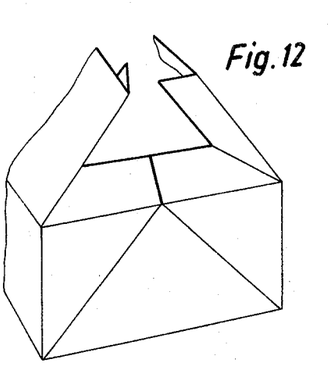
Figure 13:
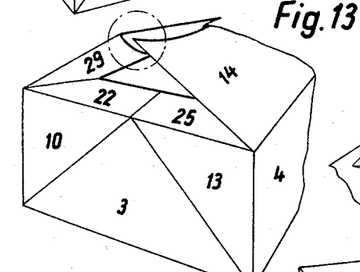
Figure 14:
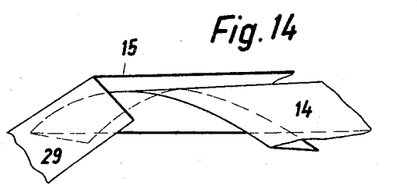
Figure 15:
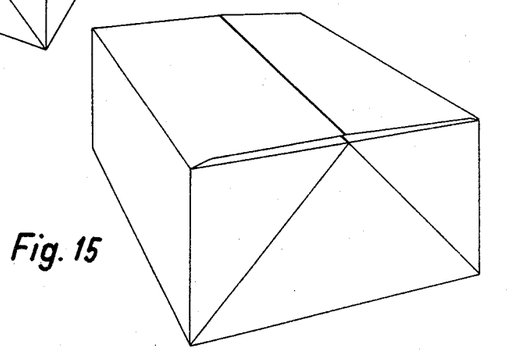
FIG. 15 is the completely closed box.

Thereupon the cover flaps 14, 15 are bent upward (FIGS. 6 and 7), the pairs of fold triangles 6, 7; 8, 9, 10, 11 and 12, 13 are folded against the side wall portions 2, 3 (FIGS. 7 to 10), the edge-strip portions 16, 17 and 18 to 25 are folded over the box opening (FIGS. 11 to 13) and finally the cover flaps 14, 15 with their edge-strip parts 26 to 29 are also folded over the cover opening (FIGS. 14 and 15).

In this connection, the cover parts can be inserted into each other in such a manner that the edge strips 28, 29 of the cover part 15 come to lie between the cover part 14 and its edge-strip parts 26, 27 or vice versa (FIG. 14).

Figure 16:
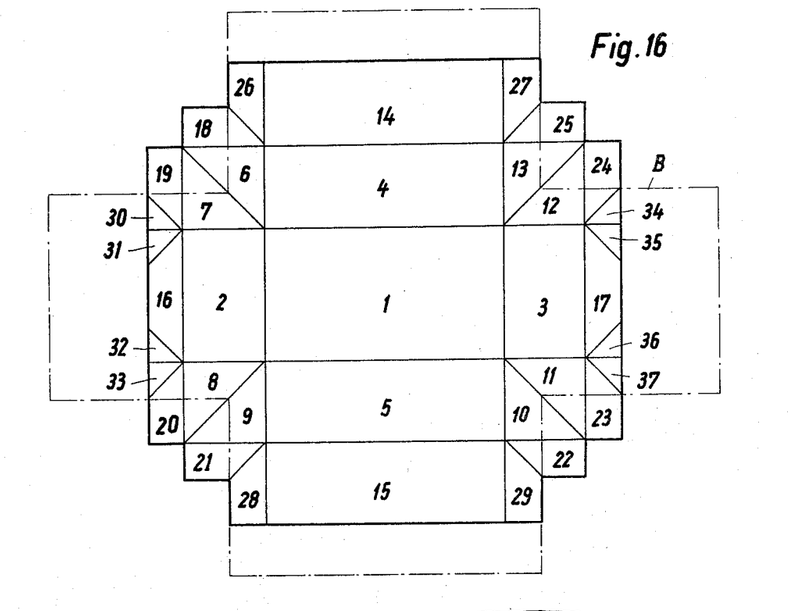
FIG. 16 shows a blank for a second embodiment of the method of the invention.
Figures 17, 18:
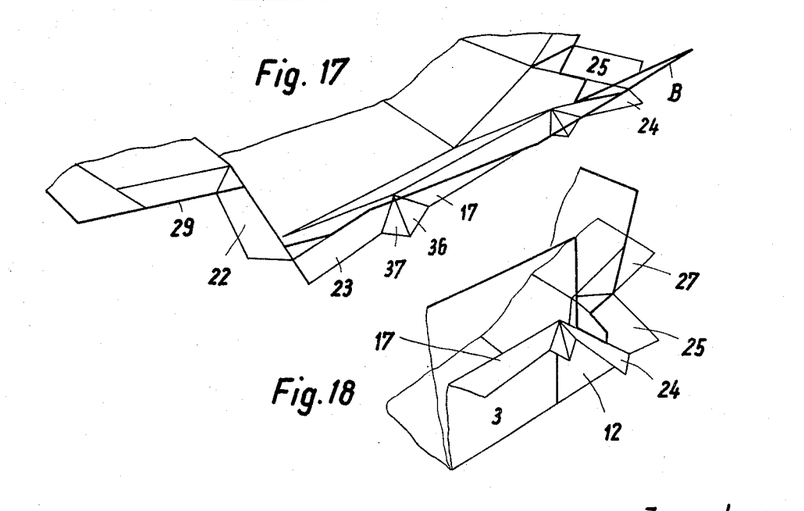
FIGS. 17 to 28 show the folding of the blank of FIG. 16.
Figures 19, 20, 21, 22, 23, 24, 25, 26, 27, 28, 29:
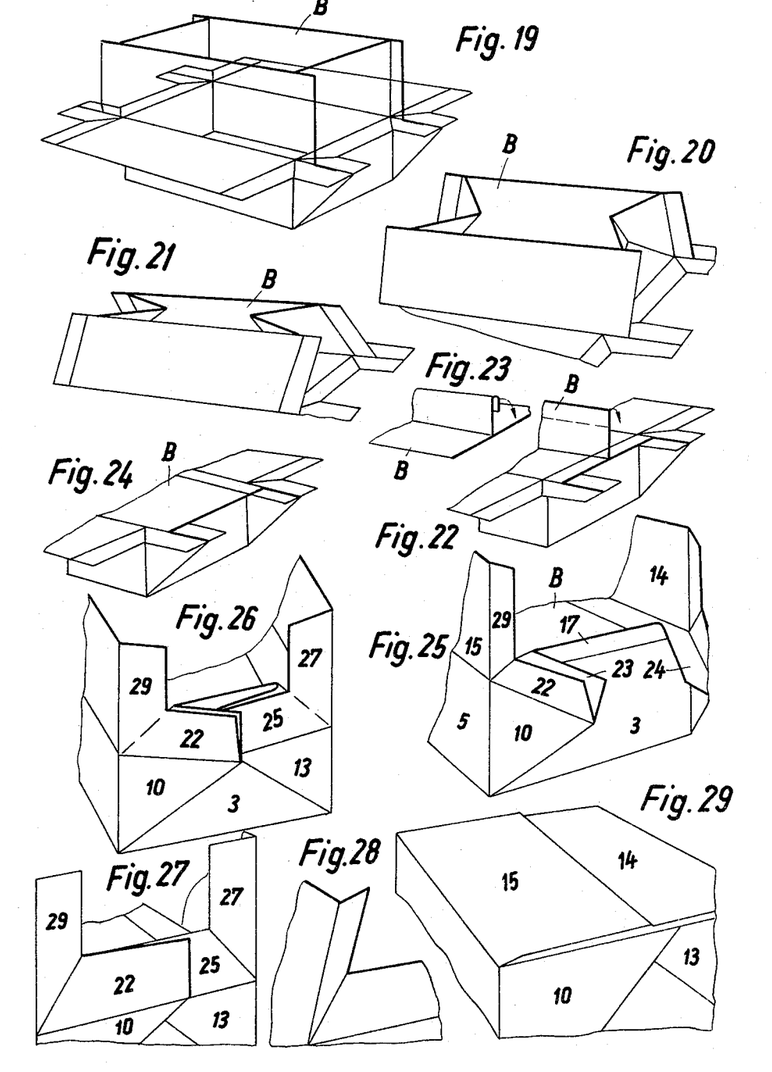
FIG. 29 shows the completely closed box made from the blank of FIG. 16.

Starting from the same basic box, one can also produce a vacuum packing. For this purpose, a sheet B is glued to the portions 1 to 13 of the blank (FIG. 16) and folded together with the latter (FIGS. 17 to 19). The sheet of course need not entirely cover the fold triangles 6 to 13 but it is sufficient if a strip facing the side wall portions is glued to these pairs of fold triangles.

Thereupon the outer box is folded up in the manner previously described (FIGS. 17 to 19). The edge-strip portions need not necessarily, however, in this connection, be bent outward, but the box can also be filled while the edge-strip parts extend upward.

After the filling, the edge-strip parts 18 to 25 can be bent inward, in which connection, the cover parts 14, 15 and their edge-strip parts 26 to 29 are simultaneously folded. In this connection, the sheet is simultaneously folded in the form of an M closure when the width of the cover flaps 14, 15 is equal to about one-half of the bottom flaps.

However, the sheet which is folded in with the outer container can also be closed separately beforehand (FIGS. 20 and 21) and the packing formed thereby possibly evacuated and thereupon the edge-strip parts folded down as previously described (FIGS. 26 to 29). In this connection, it is particularly advantageous that the closing of the sheet B can take place with the edge-strip parts bent outwards, as a result of which the sheet box can be closed without other parts of the blank being thereby disturbed.

Instead of a closure of the unilaterally open box by a sheet or other separate cover part, the closure can also be effected by cover parts of the blank.

Figure 30:
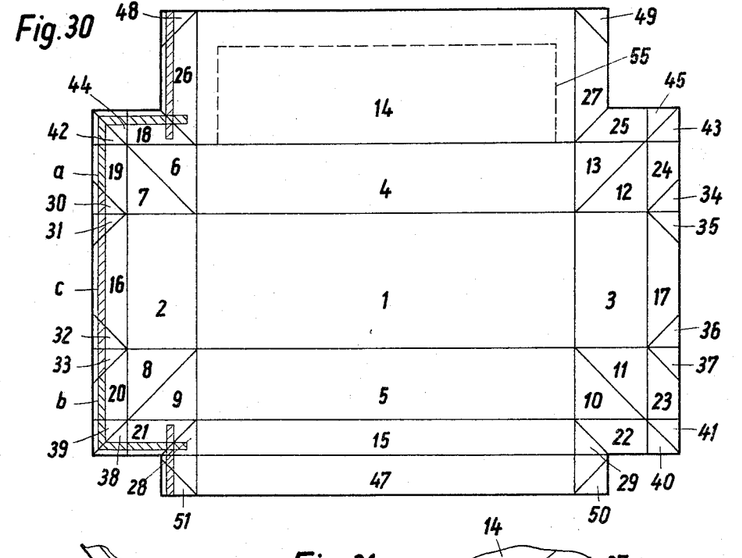
FIG. 30 shows a blank corresponding to a third embodiment of the method of the invention.

A blank suitable for this purpose is shown in FIG. 30. This blank is similar to the blank of FIG. 1 with the exception of the following parts:

The edge-strip parts 18 to 25 are all connected by pairs of triangles 38 to 45.

On the cover flap 15 there is arranged an edge-strip part 47 which can form a closure strip with the upper part of the cover part 14, which upper part also forms an edge-strip.

On the edge-strip parts 26, 27 and 28, 29 triangles 48 to 51 are provided which are subsequently necessary for the folding of the corresponding closure strips.

The folding of the box can be effected in the manner that, first of all, by straightening up the side wall parts 4, 5 and folding in the cover parts 14, 15 as well as gluing or heat-sealing the edge-strip 47 to the upper edge of the cover part 14 so as to form a closure strip which is placed on the closure part 15, a tube is formed. Thereupon the side walls 2, 3 can be folded in.

Figures 31, 32, 33:
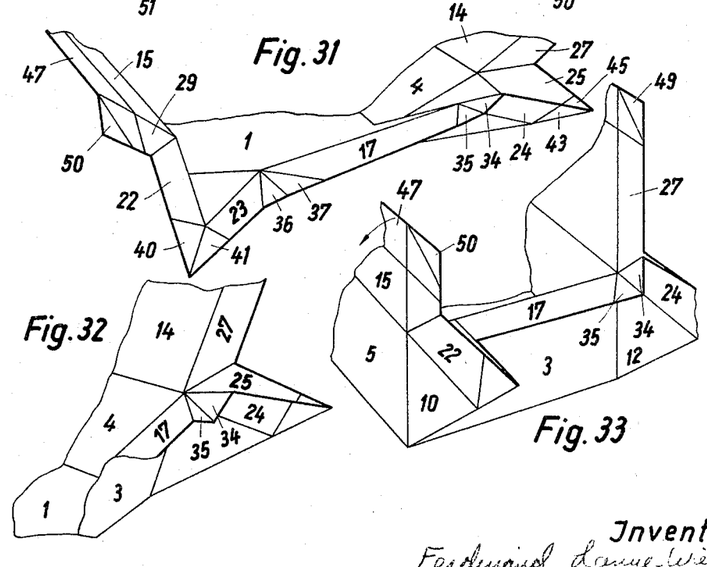
FIGS. 31 to 39 show the folding of the blank of FIG. 30.

It is much simpler, however, as described above, to produce first of all a lower part which is open on one side by means of folding blocks which act on the side wall parts 2, 3 and to bend the edge-strip parts 16, 17 downward with the bending-in of the pairs of fold triangles 30 to 37 in which connection the edge-strips 18 to 25 and the cover parts 14, 15 are then also bent down onto the box opening (FIGS. 31 to 33). After the filling, the edge-strip part 47 can be heat-sealed to the upper edge of the cover and the closure strip formed thereby can be bent down onto the cover part 15 and heat-sealed or pasted to it. The heat-sealing of this longitudinal closure strip can be effected by means of heating jaws with the closure strips somewhat erected, or possibly also at the same time as the heat-sealing together, described below, of the lateral closure strips.

Figures 34, 35, 36, 37, 38, 39, 40:
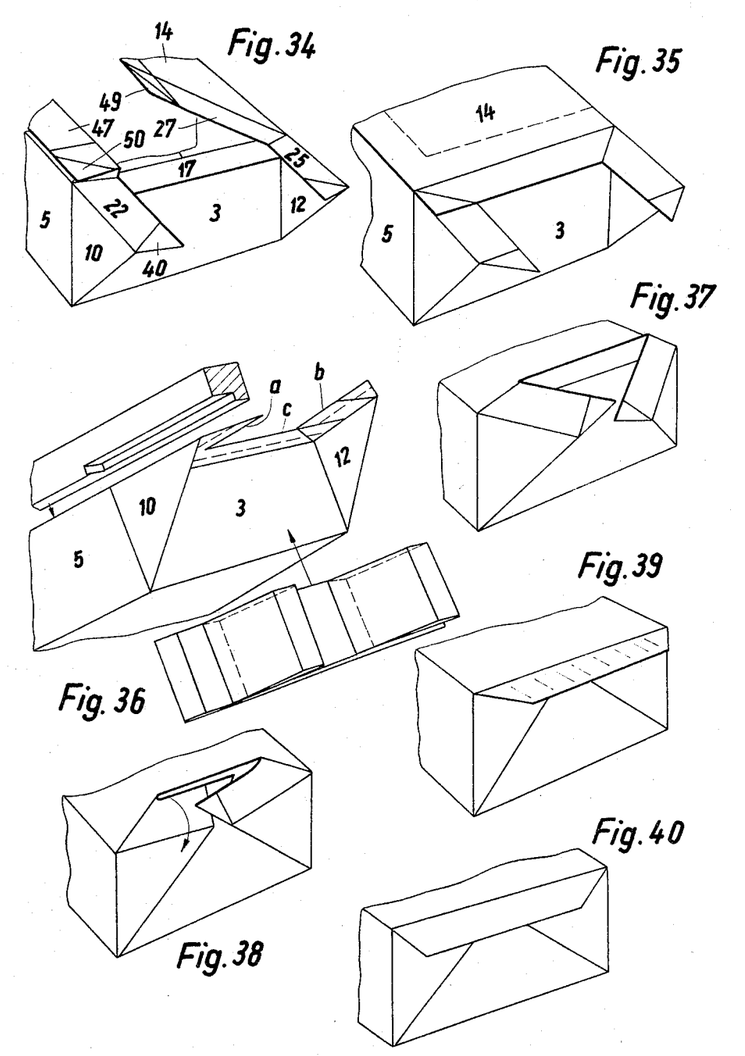
FIG. 40 shows a finished box made from the blank of FIG. 30.

The lateral closure strips, as can be noted from FIG. 36, can be seat-sealed in simple manner by heat-seal jaws which connect the edges of the edge-strip parts 18 to 25 and the adjoining pairs of fold triangles 39 to 45 to each other. The corresponding closure zones are marked *a* and *b* in FIG. 30.

A third closure zone *c* connects the edges of triangles 48 to 51 which extend perpendicular to the closure parts 14, 15 with each other and the edge-strips 26, 27 to the edge-strips 28, 29 and 16, 17 and, insofar as necessary, with the edge-strips 19, 24. At the same time, the edge-strips 28, 29 are connected with the edge-strips 20, 23 and if necessary 16, 17. Furthermore, the pairs of fold triangles 30 to 37 are connected with each other.

In connection with the tool for the production of the closure zone *c*, it is important that it dependably grasp the folding edges of the pairs of fold triangles 30 to 37, which can be effected either by sharp-edged tools or by tools which also grasp the fold triangles 6 to 13 and therefore extend somewhat beyond the actual closure zone.

The closure zones *a* to *c* can also, as can be noted from FIG. 36, be made by means of a single tool the transverse member of which corresponds precisely to the width of the box or is somewhat larger than same.

After the heat-sealing, the fold triangles 6 to 13 are folded onto the side walls, 2, 3, in which connected the remaining closure strips can be bent upward somewhat in order to facilitate this folding (FIG. 37). The closure strips which have been folded together can then also be folded against the side wall parts 2, 3 (FIGS. 38, 40) or against the cover surface.

Figure 41:
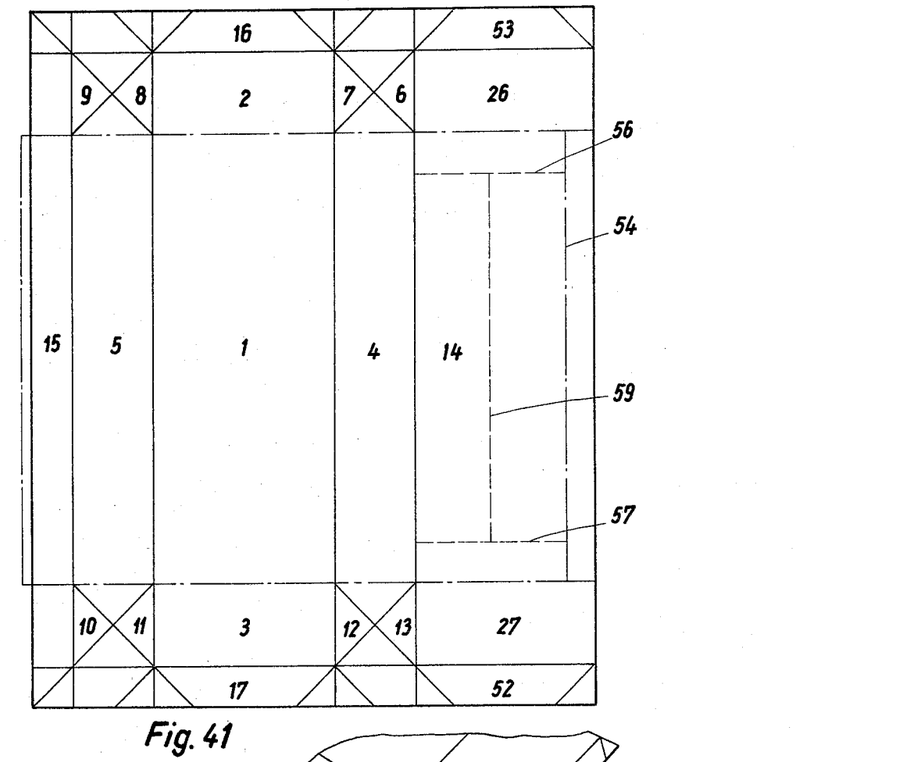
FIG. 41 shows a blank corresponding to a fourth embodiment of the method of the invention.
Figure 42:
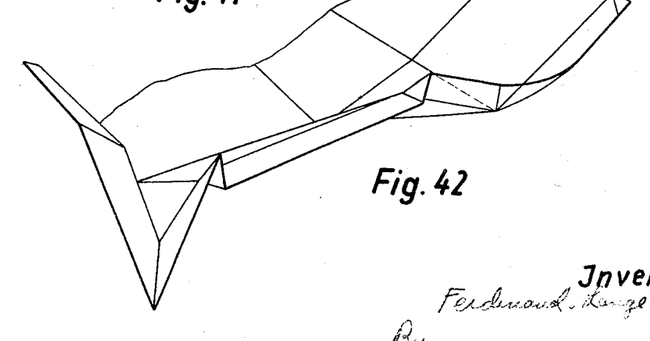
FIGS. 42 to 49 show the folding of the blank of FIG. 41.

However, the edge-strip parts 26, 27 can also be made so wide, without additional consumption of blank material, that after the folding of the lateral closure strips against the side wall parts 2, 3 they cover the latter. A rectangular blank suitable for this purpose is shown in FIG. 41.

Figures 43, 44, 45, 46, 47, 48, 49, 50:
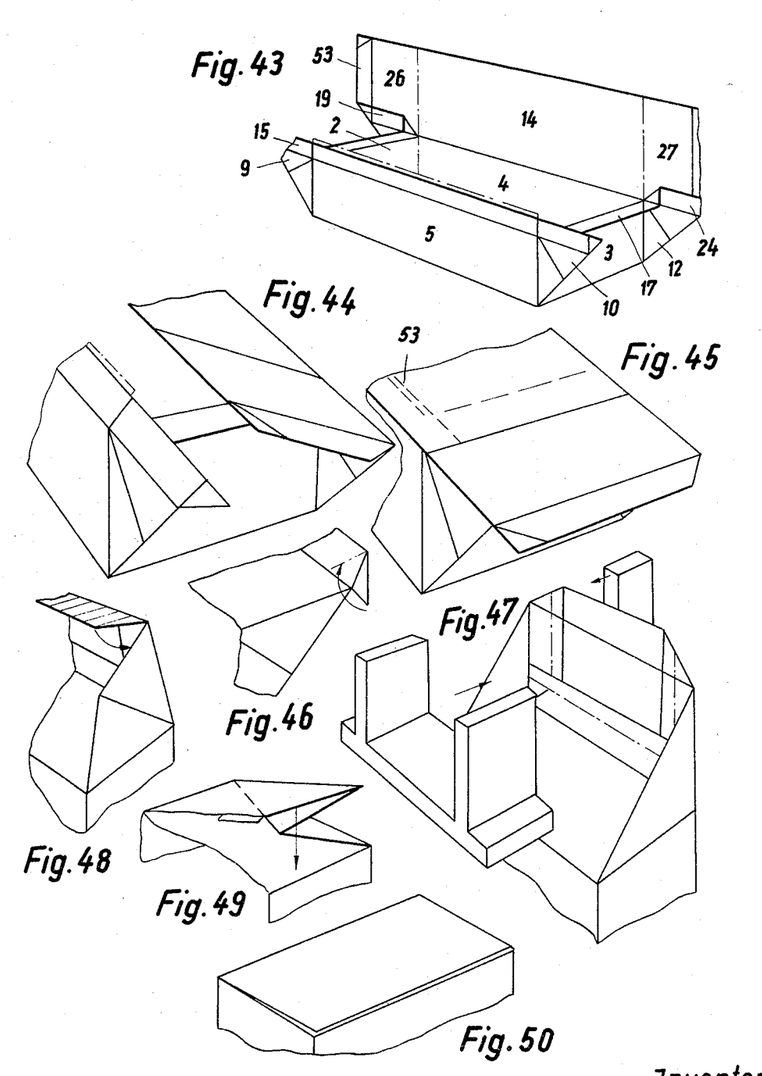
FIG. 50 shows the final box made from the blank of FIG. 41.

The folding of the unilaterally open box is effected in the same manner as described for the blank of FIG. 30. As shown in FIG. 47, the heat sealing can also be carried out in the manner corresponding to FIG. 36.

The fold triangles 6 to 13 are, however, again bent at right angles to their common folding edge before they are folded into position, as can be noted from FIGS. 48 and 49. Upon this bending-in of the pairs of fold triangles, the edge-strip parts 26, 27 are bent against the side walls 2 and 3. In this connection, the edges 52, 53 of these edge-strip parts 26, 27 can be previously folded in so that the last-mentioned edge-strip parts precisely cover the side walls 2 and 3. The folded parts 52, 53 can then be glued to the side walls 2 and 3. They furthermore form an additional reinforcement of the side walls.

In this way, it is possible in a very simple manner to manufacture a packing box which is impermeable to water vapor and aromas, and which does not have any protruding folded parts or folded parts which are folded on the outside. The container can be made from a very thin blank material, if one applies a tubular reinforcement which is marked with the reference number 53 in the blank of FIG. 41. Such a simple reinforcement is sufficient in the present case, since, as already mentioned above, the side walls 2 and 3 are already substantially reinforced by the blank parts which are folded against them.

The reinforcement 54 can, for instance, consist of corrugated cardboard or the like. This reinforcement which is pasted to the blank is folded together with the latter.

As can be noted from FIG. 41, the edges of the reinforcement do not abut at the edges of the box. In this way it is possible in simple manner to form a tear-open tab, such as can also be provided by means of a perforation 55 in the blank of FIG. 30. A corresponding perforation can be provided in the blank of FIG. 41 and at the same time in the reinforcement material.

However, when using a thin blank material, one can also dispense with such perforation and merely provide a cut in the reinforcement at 56, 57. The blank material can then be torn open along the cut edges or the abutting edges of the reinforcement and be lifted, together with the tab formed in this way in the reinforcement.

If a bend 59 is further provided in this tab, then after the first opening the tab can be inserted under the other end of the tubular reinforcement if the latter, when folded in, extends somewhat beyond the corresponding edge of the reinforcement.

I claim:
1. A blank for the production of a carton comprising, a sheet scored to divide it into a bottom wall, a pair of side walls and a pair of end walls, the end walls and side walls being joined by corner pieces, each of the corner pieces being diagonally foldable to cause it to assume a two-ply triangle shape, the blank being provided at each of its opposite ends with a continuous strip extending along edges of the end walls and edges of the corner pieces, said strips being scored at the score lines which divide the blank into walls, said strips being further provided with diagonal score lines extending from the intersection of said strips and said wall dividing score lines to provide the strip with a plurality of triangular gussets having apices at said intersections, the corner pieces being each provided at one edge with a strip member disposed at right angles to the strips on the edges of the blank, and the side walls having attached cover flaps, said cover flaps having strips at their opposite ends, said strips being joined to the strip members that are located on the corner pieces.

2. In a carton blank as provided for in claim 1, wherein the strip portions on the upper edges of the corner pieces and the strips on the upper ends of the end walls are provided with integral foldable triangular gussets permitting the respective strips and strip portions to be folded into overlying relation.

3. A carton having a bottom, upstanding side walls and end walls, cover flaps provided integrally with the side walls and projecting inwardly from the upper ends thereof, two-ply triangular flaps located between the ends of the side walls and the ends of the end walls, said flaps being folded to lie flatly against the outer faces of the end walls, the upper ends of the end walls and the upper ends of said flaps having infolded strip portions, said strips being scored at the score lines which divide the blanks into walls, said strips being further provided with diagonal score lines extending from the intersection of said strip and said blank dividing score lines to provide said strip with a plurality of triangular gussets having apices at said intersections, the strip portions on the upper ends of the flaps overlying the strip portions on the end walls when the flaps are disposed against the outside of the end walls, and the cover flaps being provided on their opposite ends with strips which overlie the strip portions on the flaps and on the end walls when the cover flaps are folded down to sealing position.

References Cited by the Examiner
UNITED STATES PATENTS
2,364,267  12/1944  Buttery _____________ 229—31
2,909,105  10/1959  Lawrence ___________ 93—11

FOREIGN PATENTS
1,172,256  10/1958  France.

GEORGE O. RALSTON, *Primary Examiner.*

FRANK E. BAILEY, *Examiner.*

B. STICKNEY, *Assistant Examiner.*